GUSTAV ADOLPH BUCHHOLZ
Imps in the manufacture of
Semolina & Flour
Sheet 1
97037
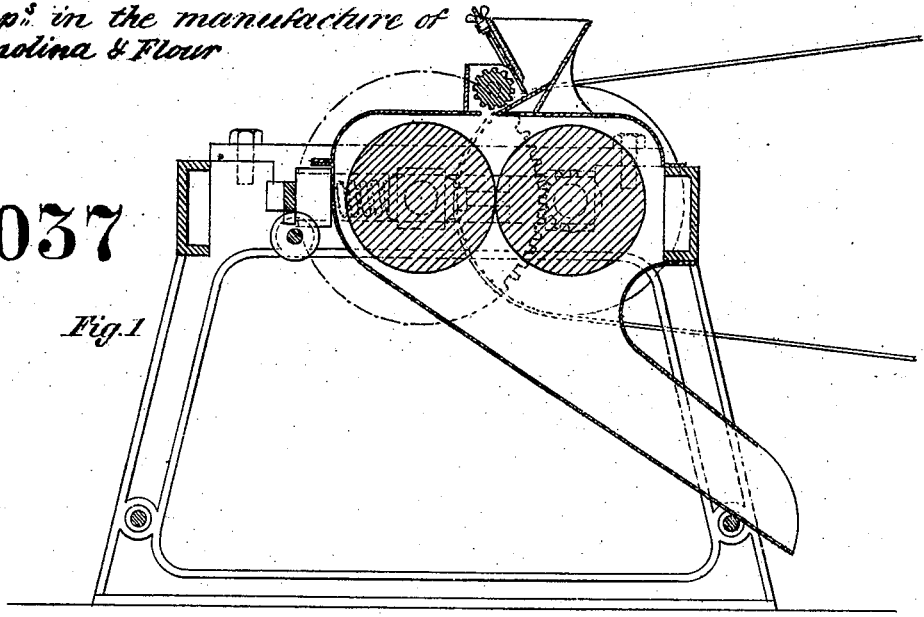
Fig. 1
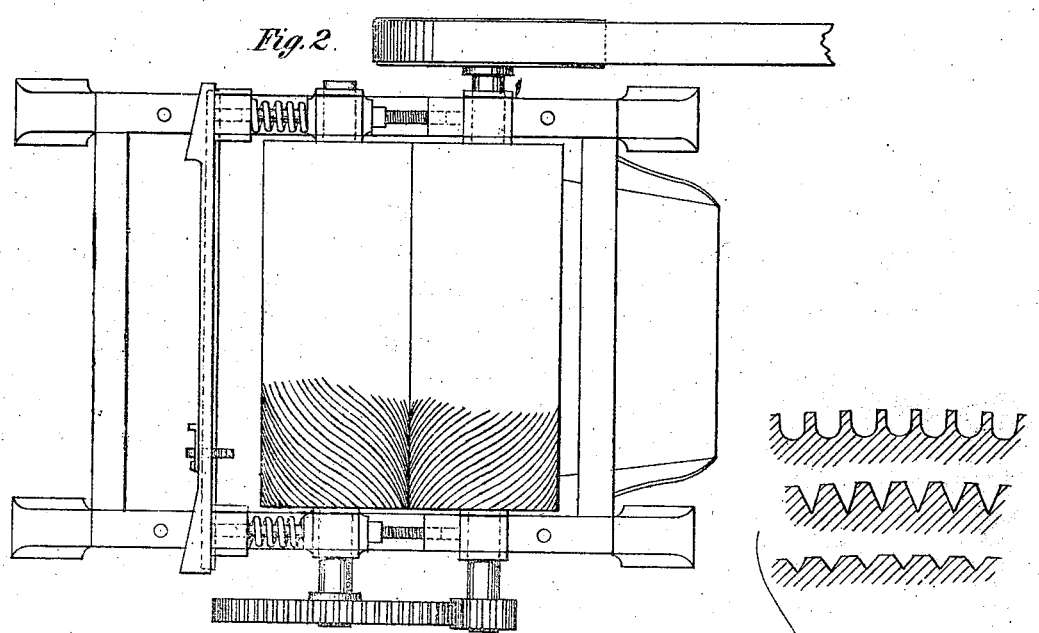
Fig. 2
Fig. 3
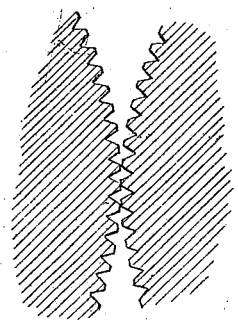
Fig. 4
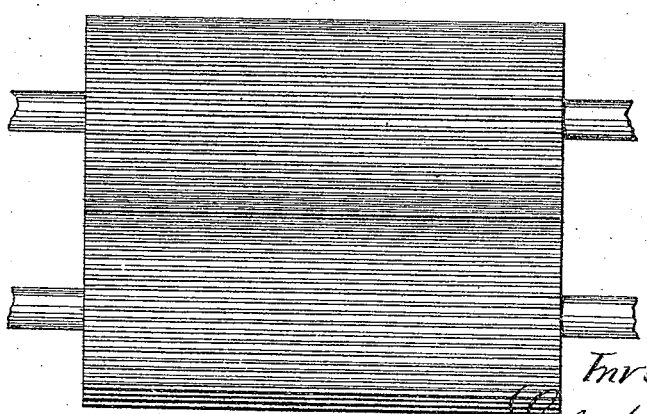
Fig. 5
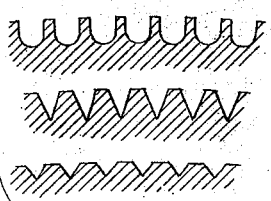
Witnesses
Chas. Nida
Mo F Brooks
Inventor
G. A. Buchholz
per
Attorneys

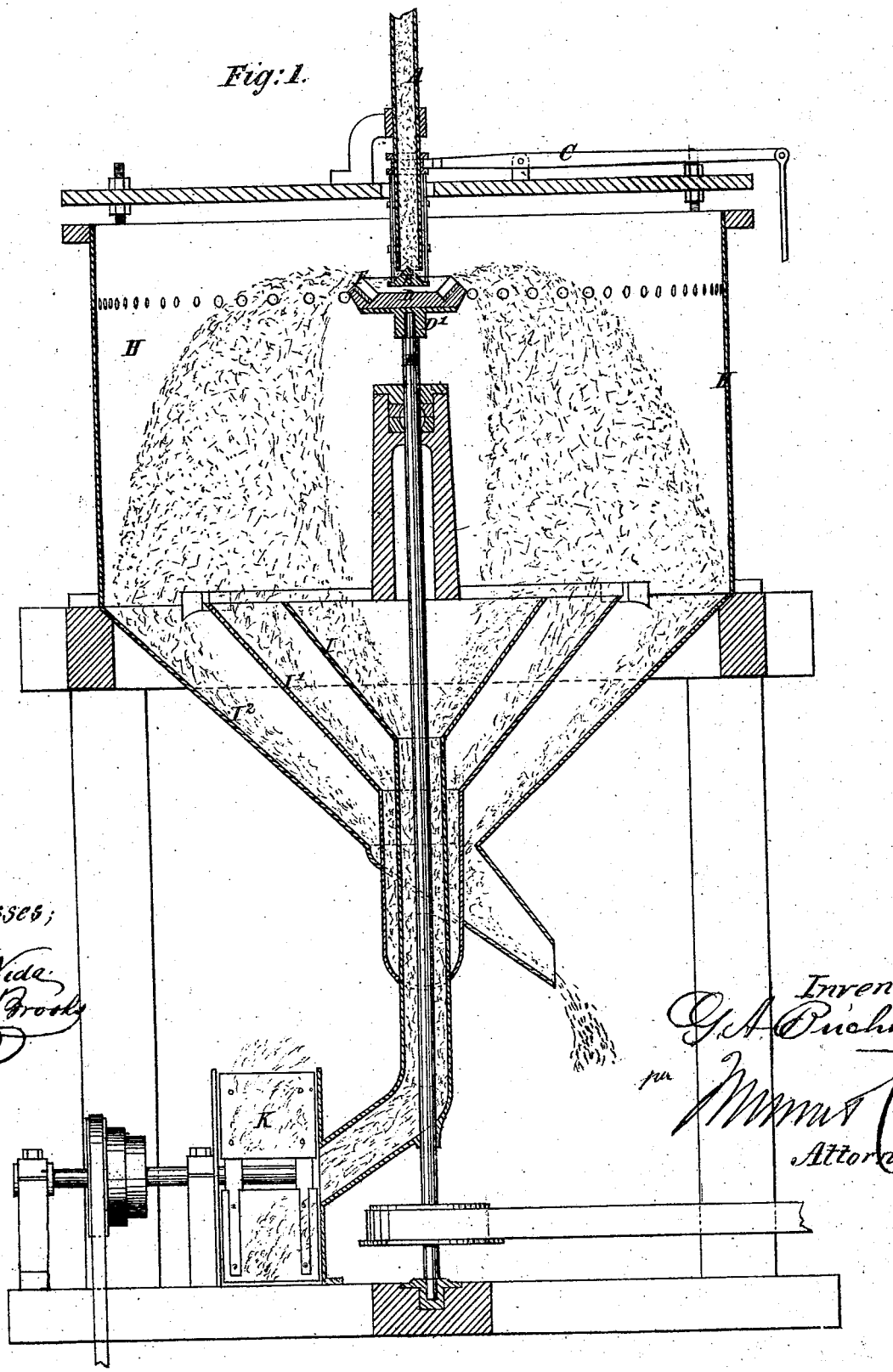

GUSTAV ADOLPH BUCHHOLZ
Imp$^{ts}$ in the Manufacture of Semolina & Flour.
Sheet III.
N°97,037
Fig: 2.
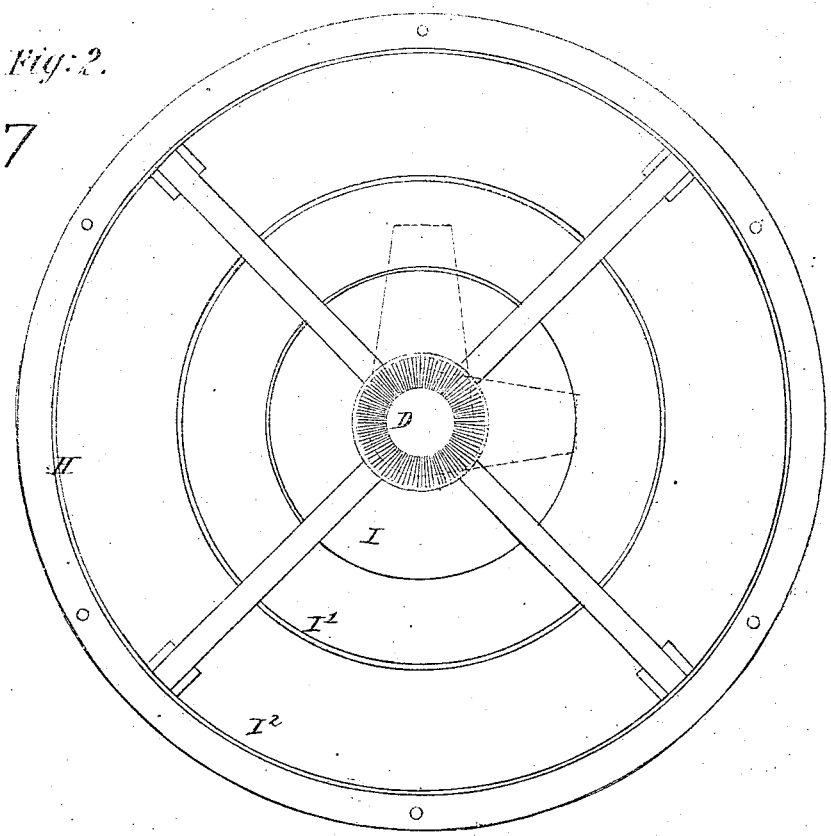
Fig: 4.
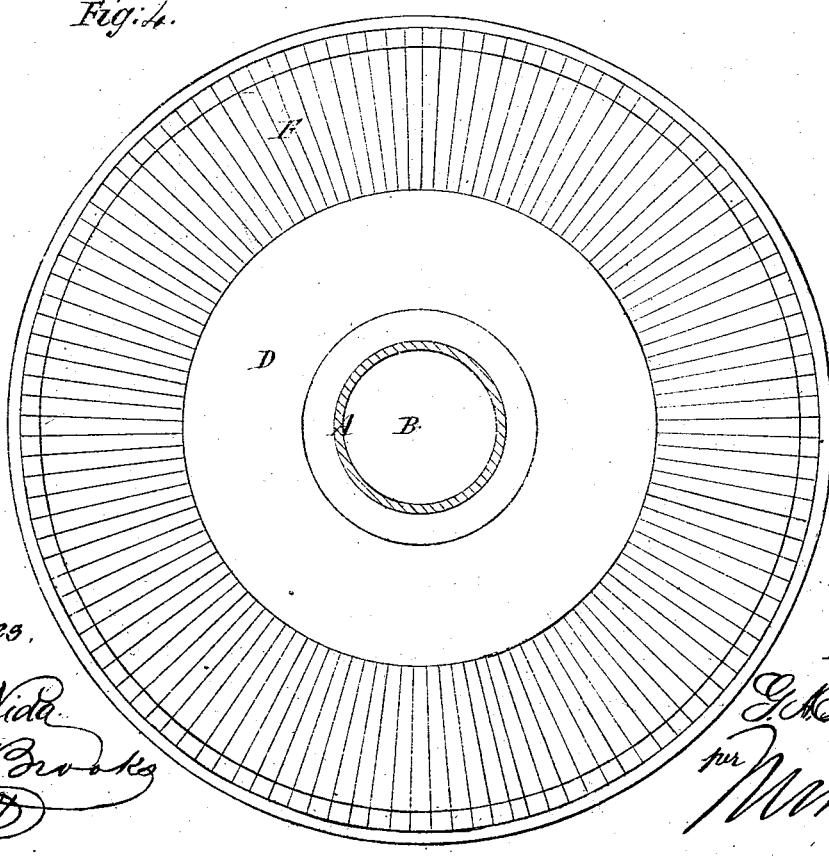
Witnesses,
Chas. Nida
Jno. K. Brooks
Inventor,
G. A. Buchholz
per Munn & Co
Attorneys.

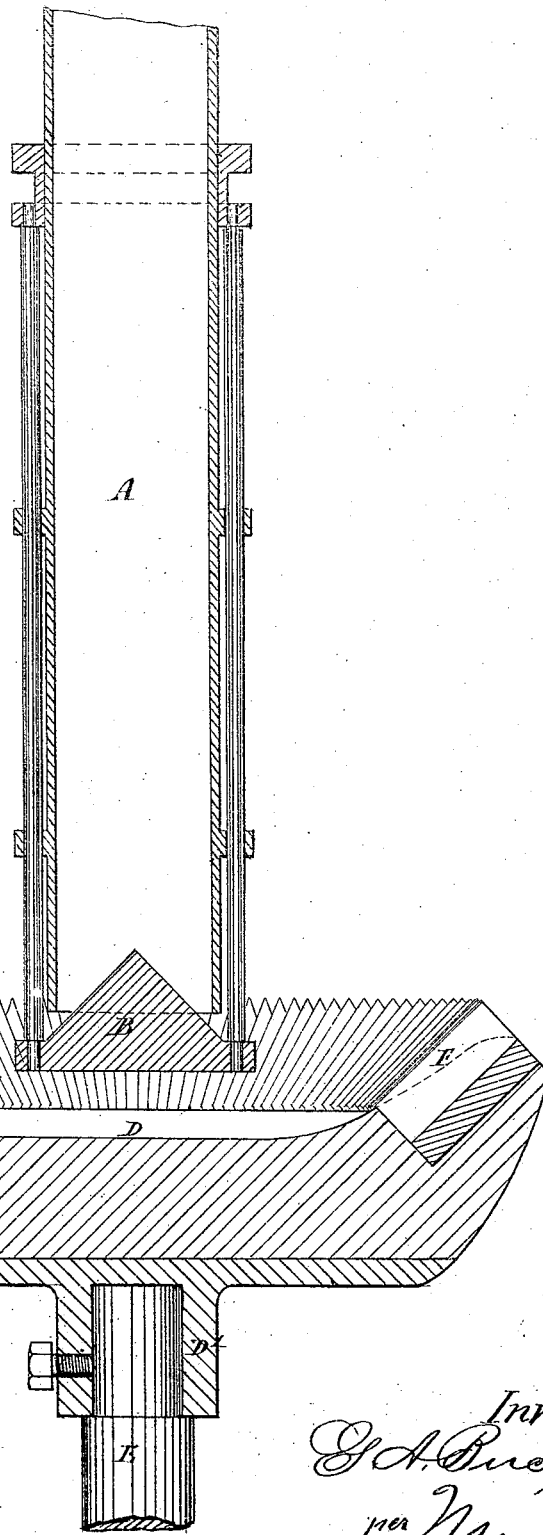

UNITED STATES PATENT OFFICE.

GUSTAV A. BUCHHOLZ, OF SHEPHERD'S BUSH, ENGLAND.

IMPROVEMENT IN MANUFACTURE OF AND MEANS OF ASSORTING SEMOLINA AND FLOUR.

Specification forming part of Letters Patent No. 97,037, dated November 23, 1869; patented in England March 28, 1867.

*To all whom it may concern:*

Be it known that I, G. A. BUCHHOLZ, of Shepherd's Bush, county of Middlesex, England, have invented a new and useful Improvement in the Manufacture of and Means of Assorting Semolina, and in the reduction of the same to flour; and I do hereby declare that the following is a full, clear, and exact description thereof, which will enable others skilled in the art to make and use the same, reference being had to the accompanying drawings, forming part of this specification.

In the application for patent bearing even date herewith, and marked Case I, I have described an arrangement of mill for ripping the hulled grain for the conversion of the same into semolina. By the use of this mill a large percentage of the ripped grain was left unconverted, and required subsequent treatment to manufacture it into semolina or into flour, which operations had to be effected by any well-known or apparent means.

I now propose, under the present application, to take up the manufacture of semolina and flour at the point that the material left the ripping-mill—that is to say, after the semolina produced by the action of the ripping-mill on the hulled grain has been sifted out, I act upon the residue in the manner to be presently described, in order to convert it into semolina or into flour; or I take the whole of the product from the ripping-mill, and convert the same into flour by means of rollers constructed and operated in the manner hereafter described, instead of subjecting the ripped grain to millstones or equivalent grinding machinery.

To attain these results I use pairs of grooved rollers, which are nicely adjusted to their work, and are speeded so that one roller will rotate, say, from four to six times as fast as the other roller, and thereby reduce by a cutting in contradistinction to a crushing action the ripped corn into particles of the required size. The rollers are mounted after the manner described in the specification of my above-mentioned application, and are fed with the ripped grain from a hopper. The passing of the ripped grain between the rollers will convert the same, or a very large portion of it, into semolina, which, together with the bran and any flour that may be formed, will be conducted out of the mill by a chute.

The arrangement of mill which I employ is shown in vertical section at Fig. 1, Sheet I. The kind of grooved roller which I prefer to employ for converting the grain into semolina is shown in plan view at Fig. 2, and in partial end elevation at Fig. 3; but I do not confine myself to the use of cutting-rollers having the sectional form of ribs or grooves shown at Fig. 3, as that may be greatly varied without materially affecting the action of the rollers. The grooving (see Fig. 2) takes a helical direction in one roller to the left, and in the other to the right hand, in each case the twist being at about an angle of forty-five degrees to the axis of the roller.

Instead of this helical arrangement of the grooves, I can make very good work with straight-grooved rollers, similar to that shown at Fig. 4; but I have found that a better result is obtained by lengthening the time of contact between the grains and the acting surface of the separating-rollers, and this I effect by cutting the grooves in helical lines around the peripheries of the rollers, as already explained. The material, as it leaves the rollers, will consist of semolina of different qualities, of fragments of the grain carrying bran upon their surface, of loose bran, and a small percentage of flour.

In order to assort the grains of semolina according to their qualities and remove the bran therefrom, I use a novel kind of centrifugal machine, which is shown in sectional elevation at Fig. 1, Sheet II, and in plan view (the upper part being removed) at Fig. 2, Sheet III.

This machine may be described as follows: A hopper (not shown in the drawing) is provided for receiving the material to be assorted. The pendent discharge-tube A of this hopper is fitted at bottom with a valve, B, (see the detached views, Figs. 3 and 4, Sheets III and IV,) which represent on an enlarged scale, in sectional elevation and plan view, what I term the "spreader," to be more particularly described hereafter. The valve B is capable of vertical adjustment by means of a balanced rock-lever, C, to regulate the flow of the material from the hopper into the assorting-machine. The semolina, with the bran, falls from this hopper into the spreader before mentioned, which consists of a rotating shallow cup, in the lip of which are set inclined radial blades, to assist in the discharge of the material horizontally by centrifugal action, in order that it may fall nearer to or farther from the axis of rotation of the spreader, according to the specific gravity of the individual particles. D is the cup, formed of wood, fitted to a flanged boss, D', keyed to a vertical spindle, E. In the lip of the cup D vertical grooves are cut radially, and at equal distances apart, to receive the steel blades F. These blades act as rotating arms or beaters, to throw the material of the cup as it is discharged into the cup from the tube A.

The apparatus thus constructed is mounted in a cylindrical casing, H, and the spindle E projects down through the bottom of the casing, it being held securely in place by a central bearing cast on the bottom of the casing H. The shaft may be driven by gearing in the ordinary way. Below the casing, and connected by means of openings in the bottom with the interior, is a set of three, or it may be less or more, concentric funnels, I I¹ I², which are intended, respectively, to receive the assorted substances and deliver them to proper receptacles. By the rotation of the spreader, into which the semolina to be assorted is delivered, a centrifugal motion will be imparted to the semolina, and the heavy grains discharged into the casing will fall near its periphery and find their way into the outer funnel I². The lighter semolina will fall within the circle of the heavier particles, and will be discharged into the second funnel, I¹, and the bran mixed with the semolina will fall nearer the center of motion, and escape through the central funnel I. To facilitate the operation of this apparatus, I propose to admit air freely to the cylindrical case, and to maintain a partial exhaustion in the funnels by means of an exhaust-fan, K, which I connect thereto, as shown at Fig. 1. The semolina thus assorted I propose in some cases to reduce to flour, using the heavy or best semolina for the best flour, and the lighter for an inferior quality. In other cases I collect the heavy semolina and store it for sale.

In manufacturing semolina by cutting-rollers, as above described, I found that the size of the semolina produced depended upon the size of the grooves of the cutting-rollers. Judging from this fact, that it was possible to reduce the grain to flour by modifying the apparatus, I have been enabled by experiment to demonstrate the accuracy of this conclusion, and I therefore, instead of submitting the semolina to stones for the purpose of reducing it to flour, run it through one or more pairs of steel rollers, having fine straight or helical grooves on their periphery, preferring the form of ribs and grooves shown at Fig. 5, Sheet I. These rollers being driven at different speeds (say six to one) will insure the requisite cutting-action, and produce cut in contradistinction to crushed flour. The sectional form of the ribs of the steel rollers may, however, vary, as indicated by the diagrams, Fig. 5.

Having now set forth the nature of my invention of improvements in the manufacture and assorting of semolina and reducing the same to flour, and explained the manner of carrying the same into effect, I wish it to be understood that I claim—

1. The converging funnels I I¹ I², arranged around the rotating shaft B, to receive, convey, and discharge into separate receptacles the different sizes of ripped grain, in the manner described.

2. The said funnels I I¹ I², in combination with a centrifugal spreader, conical valve, and delivery-tube, all arranged and operating together in the manner set forth.

3. A centrifugal spreader, D, provided with a series of steel blades, F, arranged around its beveled inner surface, as shown and described.

The above specification signed by me this 12th day of July, 1869.

G. A. BUCHHOLZ.

Witnesses:
FRED. WALKDEN,
   66 Chancery Lane, London.
DAN FORSHAW,
   24 Royal Exchange, London.